(12) United States Patent
Lim

(10) Patent No.: US 11,758,144 B2
(45) Date of Patent: Sep. 12, 2023

(54) METHOD AND APPARATUS FOR ENCODING/DECODING A VIDEO SIGNAL BASED ON WEIGHTED PREDICTION, AND A RECORDING MEDIUM STORING A BITSTREAM

(71) Applicant: KT CORPORATION, Gyeonggi-do (KR)

(72) Inventor: Sung Won Lim, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 17/994,250

(22) Filed: Nov. 25, 2022

(65) Prior Publication Data

US 2023/0089718 A1     Mar. 23, 2023

Related U.S. Application Data

(62) Division of application No. 17/342,933, filed on Jun. 9, 2021.

(30) Foreign Application Priority Data

Jun. 10, 2020  (KR) .................. 10-2020-0070334
Jun. 7, 2021   (KR) .................. 10-2021-0073302

(51) Int. Cl.
  *H04N 7/12*       (2006.01)
  *H04N 19/137*     (2014.01)
  *H04N 19/159*     (2014.01)
  *H04N 19/174*     (2014.01)
  *H04N 19/176*     (2014.01)
  *H04N 19/46*      (2014.01)
  *G06T 9/00*       (2006.01)
  *H04N 19/127*     (2014.01)
  *H04N 19/189*     (2014.01)

(52) U.S. Cl.
  CPC .......... *H04N 19/137* (2014.11); *G06T 9/004* (2013.01); *H04N 19/127* (2014.11); *H04N 19/159* (2014.11); *H04N 19/174* (2014.11); *H04N 19/176* (2014.11); *H04N 19/189* (2014.11); *H04N 19/46* (2014.11)

(58) Field of Classification Search
  CPC ..... H04N 19/127; H04N 19/189; G06T 9/004
  See application file for complete search history.

(56) References Cited

U.S. PATENT DOCUMENTS 11,190,770 B2   11/2021   Lee

*Primary Examiner* — Y Lee
(74) *Attorney, Agent, or Firm* — IP Legal Services, LLC

(57) ABSTRACT

Provided are a method and apparatus for decoding video signal based on weighted prediction. The method may include determining an inter prediction mode of a current block, deriving motion information of a current block according to the inter prediction mode, obtaining a first prediction block of the current block based on the motion information, and obtaining a second prediction block of the current block by applying at least one of a weight, an offset, or a first variable for explicit weighted prediction to the first prediction block.

13 Claims, 4 Drawing Sheets

METHOD AND APPARATUS FOR ENCODING/DECODING A VIDEO SIGNAL BASED ON WEIGHTED PREDICTION, AND A RECORDING MEDIUM STORING A BITSTREAM

CROSS REFERENCE TO RELATED APPLICATIONS

This application is a Divisional of U.S. patent application Ser. No. 17/342,933 (filed on Jun. 9, 2021), which claims priority under 35 U.S.C. § 119 to Korean Patent Application No. 10-2020-0070334 (filed on Jun. 10, 2020), and 10-2021-0073302 (filed on Jun. 7, 2021).

TECHNICAL FIELD

The present invention relates to a method and an apparatus for processing video signal.

BACKGROUND ART

Recently, demands for high-resolution and high-quality images such as high definition (HD) images and ultra-high definition (UHD) images have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques may be utilized.

Image compression technology includes various techniques, including: an inter prediction technique of predicting a pixel value included in a current picture from a previous or subsequent picture of the current picture; an intra prediction technique of predicting a pixel value included in a current picture by using pixel information in the current picture; an entropy encoding technique of assigning a short code to a value with a high appearance frequency and assigning a long code to a value with a low appearance frequency; and the like. Image data may be effectively compressed by using such image compression technology, and may be transmitted or stored.

In the meantime, with demands for high-resolution images, demands for stereographic image content, which is a new image service, have also increased. A video compression technique for effectively providing stereographic image content with high resolution and ultra-high resolution is being discussed.

DISCLOSURE

Technical Problem

The present disclosure is to provide a method and apparatus for deriving motion information for inter prediction.

The present disclosure is to provide a method and apparatus for improving the precision of inter prediction and reducing the complexity of inter prediction.

The technical objects to be achieved by the present disclosure are not limited to the above-mentioned technical problems. And, other technical problems that are not mentioned will be apparently understood to those skilled in the art from the following description.

Technical Solution

A method of decoding an image according to the present disclosure comprises determining an inter prediction mode of a current block, deriving motion information of the current block according to the determined inter prediction mode, obtaining a first prediction block of the current block based on the derived motion information, and obtaining a second prediction block of the current block by applying at least one of a weight, an offset, or a first variable for explicit weighted prediction to the first prediction block.

In the image decoding method according to the present disclosure, the weight and the the offset are derived based on weighted prediction information for the explicit weighted prediction.

In the image decoding method according to the present disclosure, the weighted prediction information includes at least one of common weight information, weight number information, a first flag indicating whether a weight exists, weight delta information, or offset information In the image decoding method according to the present disclosure, the first variable is a variable derived based on the common weight information.

In the image decoding method according to the present disclosure, the current block performs only one of L0 prediction or L1 prediction In the image decoding method according to the present disclosure, obtaining the second prediction block of the current block is performed without considering whether the first variable is less than a predetermined threshold value.

In the image decoding method according to the present disclosure, whether the explicit weighted prediction is applied is determined based on at least one of a predetermined second flag or a weight index for default weighted prediction, and the second flag is set based on a slice type of a slice to which the current block belongs.

In the image decoding method according to the present disclosure, when the slice to which the current block belongs is a P slice, the second flag is set as a value of a flag specifying whether the explicit weighted prediction is applied to the P slice, and when the slice to which the current block belongs is a B slice, the second flag is set based on at least one of a third flag specifying whether the explicit weighted prediction is applied to the B slice or a fourth flag specifying whether a mode for improving a pre-derived motion vector in an image decoding apparatus is applied.

In the image decoding method according to the present disclosure, a value of the fourth flag is determined by considering at least one of the inter prediction mode of the current block, whether bi-prediction is applied to the current block, a location/type of a reference picture of the current block, the weight index for the default weighted prediction, whether the reference picture of the current block has a weight for the explicit weighted prediction or a size of the current block.

In the image decoding method according to the present disclosure, the weight index for the default weighted prediction is information specifying any one of a plurality of weight candidates pre-defined in the image decoding apparatus, and the plurality of weight candidates include at least one of {4, 4}, {3, 5}, {5, 3}, {−2, 10}, or {10, −2}.

A method of encoding an image according to the present disclosure comprises determining an inter prediction mode of a current block and deriving motion information of the current block according to the determined inter prediction mode.

In the image encoding method according to the present disclosure, a first prediction block of the current block is obtained based on the derived motion information, and a second prediction block of the current block is obtained by applying at least one of a weight, an offset, or a first variable for explicit weighted prediction to the first prediction block.

In the image encoding method according to the present disclosure, weighted prediction information for the explicit weighted prediction is encoded based on the weight and the offset, and the weighted prediction information includes at least one of common weight information, weight number information, a first flag indicating whether a weight exists, weight delta information, or offset information.

In the image encoding method according to the present disclosure, the first variable is a variable derived based on the common weight information.

In the image encoding method according to the present disclosure, the current block performs only one of L0 prediction or L1 prediction In the image encoding method according to the present disclosure, obtaining the second prediction block of the current block is performed without considering whether the first variable is less than a predetermined threshold value.

In the image encoding method according to the present disclosure, whether the explicit weighted prediction is applied is determined based on at least one of a predetermined second flag or a weight index for default weighted prediction, and the second flag is set based on a slice type of a slice to which the current block belongs.

In the image encoding method according to the present disclosure, when the slice to which the current block belongs is a P slice, the second flag is set as a value of a flag specifying whether the explicit weighted prediction is applied to the P slice, and when the slice to which the current block belongs is a B slice, the second flag is set based on at least one of a third flag specifying whether the explicit weighted prediction is applied to the B slice or a fourth flag specifying whether a mode for improving a pre-derived motion vector in an image decoding apparatus is applied.

In the image encoding method according to the present disclosure, a value of the fourth flag is determined by considering at least one of the inter prediction mode of the current block, whether bi-prediction is applied to the current block, a location/type of a reference picture of the current block, the weight index for the default weighted prediction, whether the reference picture of the current block has a weight for the explicit weighted prediction or a size of the current block.

In the image encoding method according to the present disclosure, the weight index for the default weighted prediction is information specifying any one of a plurality of weight candidates pre-defined in the image decoding apparatus, and the plurality of weight candidates include at least one of {4, 4}, {3, 5}, {5, 3}, {−2, 10}, or {10, −2}.

The bitstream decoded by the image decoding method according to the present disclosure or encoded by the image encoding method may be stored in a computer-readable recording medium.

The features briefly summarized above for the present disclosure are only illustrative aspects of the detailed description of the disclosure that follows, but do not limit the scope of the disclosure.

Advantageous Effects

According to the present disclosure, motion information can be more accurately predicted by using various merge candidates.

According to the present disclosure, the accuracy of inter prediction can be improved by selectively using default/explicit weighted prediction.

The complexity of weighted prediction may be reduced through explicit weighted prediction according to the present disclosure.

The effects obtainable by the present disclosure are not limited to the above-mentioned effects, and other effects not mentioned can be clearly understood by those skilled in the art from the description below.

MODE FOR INVENTION

Figure 1:
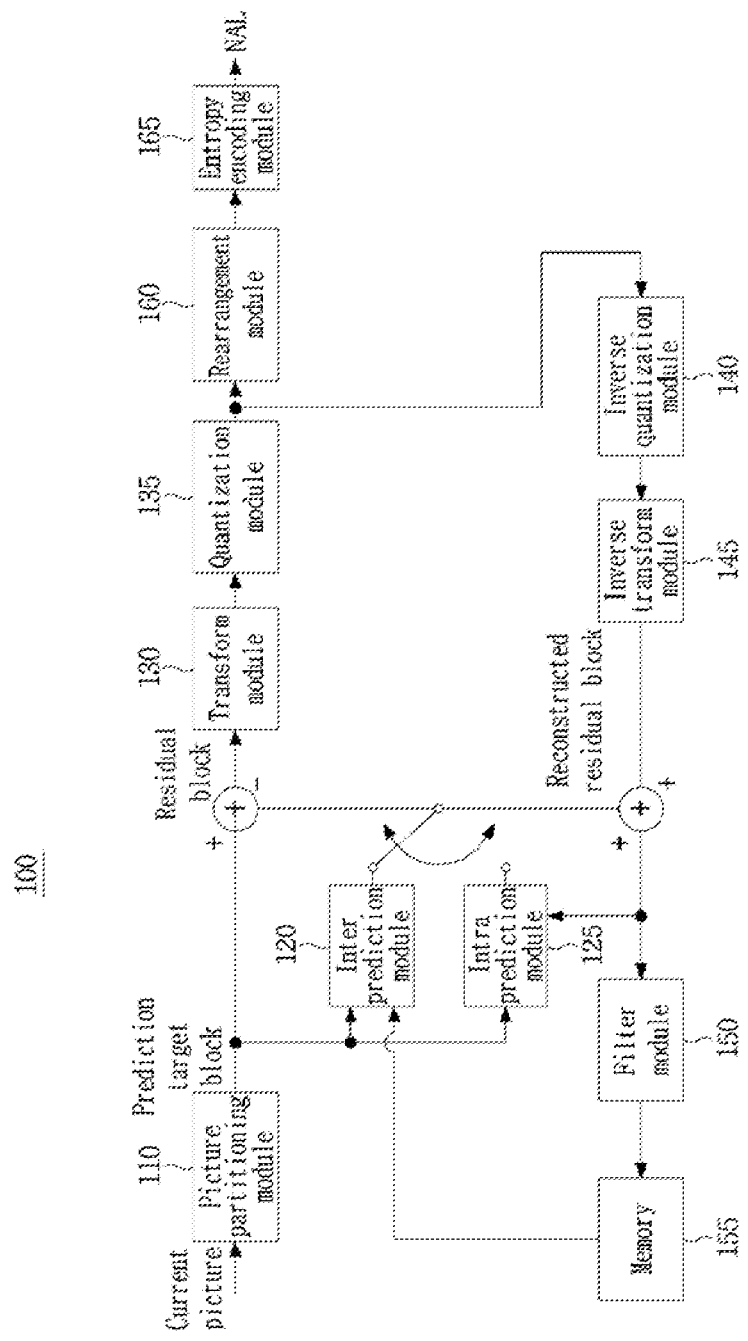
FIG. 1 is a block diagram illustrating a device for encoding a video according to an embodiment of the present disclosure.

A variety of modifications may be made to the present invention and there are various embodiments of the present invention, examples of which will now be provided with reference to drawings and described in detail. However, the present invention is not limited thereto, and the exemplary embodiments can be construed as including all modifications, equivalents, or substitutes in a technical concept and a technical scope of the present invention. The similar reference numerals refer to the similar element in described the drawings.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

Hereinafter, preferred embodiments of the present invention will be described in detail with reference to the accompanying drawings. Hereinafter, the same constituent elements in the drawings are denoted by the same reference numerals, and a repeated description of the same elements will be omitted.

FIG. 1 is a block diagram illustrating a device for encoding a video according to an embodiment of the present disclosure.

Referring to FIG. 1, the device 100 for encoding a video may include: a picture partitioning module 110, prediction modules 120 and 125, a transform module 130, a quantization module 135, a rearrangement module 160, an entropy encoding module 165, an inverse quantization module 140, an inverse transform module 145, a filter module 150, and a memory 155.

The constitutional parts shown in FIG. 1 are independently shown so as to represent characteristic functions different from each other in the device for encoding a video, and does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be partitioned into a plurality of constitutional parts to perform each function. The embodiment where each constitutional part is combined and the embodiment where one constitutional part is partitioned are also included in the scope of the present invention, if not departing from the essence of the present invention.

Also, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

The picture partitioning module 110 may partition an input picture into one or more processing units. Here, the processing unit may be a prediction unit (PU), a transform unit (TU), or a coding unit (CU). The picture partitioning module 110 may partition one picture into combinations of a plurality of coding units, prediction units, and transform units, and may encode a picture by selecting one combination of coding units, prediction units, and transform units with a predetermined criterion (e.g., cost function).

For example, one picture may be partitioned into a plurality of coding units. A recursive tree structure, such as a quad tree structure, may be used to partition a picture into coding units. A coding unit which is partitioned into other coding units with one picture or a largest coding unit as a root may be partitioned with child nodes corresponding to the number of partitioned coding units. A coding unit which is no longer partitioned by a predetermined limitation serves as a leaf node. That is, when it is assumed that only square partitioning is possible for one coding unit, one coding unit may be partitioned into four other coding units at most.

Hereinafter, in the embodiment of the present invention, the coding unit may mean a unit performing encoding, or a unit performing decoding.

A prediction unit may be one of partitions partitioned into a square or a rectangular shape having the same size in a single coding unit, or a prediction unit may be one of partitions partitioned so that one prediction unit of prediction units partitioned in a single coding unit have a different shape and/or size from other prediction unit.

In the intra prediction, the transform unit and the prediction unit may be set to be the same. In this case, after dividing the coding unit into a plurality of transform units, intra prediction may be performed for each transform unit. The coding unit may be divided in a horizontal direction or a vertical direction. The number of transform units generated by dividing the coding unit may be 2 or 4 depending on the size of the coding unit.

The prediction modules 120 and 125 may include an inter prediction module 120 performing inter prediction and an intra prediction module 125 performing intra prediction. Whether to perform inter prediction or intra prediction for the prediction unit may be determined, and detailed information (e.g., an intra prediction mode, a motion vector, a reference picture, etc.) according to each prediction method may be determined. Here, the processing unit performing prediction may be different from the processing unit for which the prediction method and detailed content is determined. For example, the prediction method, the prediction mode, etc. may be determined on the basis of the prediction unit, and prediction may be performed on the basis of the transform unit. A residual value (residual block) between the generated prediction block and an original block may be input to the transform module 130. Also, prediction mode information, motion vector information, etc. used for prediction may be encoded with the residual value in the entropy encoding module 165 and may be transmitted to a device for decoding a video. When a particular encoding mode is used, it is possible to transmit to a device for decoding video by encoding the original block as it is without generating the prediction block through the prediction modules 120 and 125.

The inter prediction module 120 may predict the prediction unit based on information of at least one of a previous picture or a subsequent picture of the current picture, or may predict the prediction unit based on information of some encoded regions in the current picture, in some cases. The inter prediction module 120 may include a reference picture interpolation module, a motion prediction module, and a motion compensation module.

The reference picture interpolation module may receive reference picture information from the memory 155 and may generate pixel information of an integer pixel or less then the integer pixel from the reference picture. In the case of luma pixels, an 8-tap DCT-based interpolation filter having different filter coefficients may be used to generate pixel information of an integer pixel or less than an integer pixel on the basis of a ¼ pixel. In the case of chroma signals, a 4-tap DCT-based interpolation filter having different filter coefficient may be used to generate pixel information of an integer pixel or less than an integer pixel on the basis of a ⅛ pixel.

The motion prediction module may perform motion prediction based on the reference picture interpolated by the reference picture interpolation module. As methods for calculating a motion vector, various methods, such as a full search-based block matching algorithm (FBMA), a three step search (TSS), a new three-step search algorithm (NTS), etc., may be used. The motion vector may have a motion vector value on the basis of a ½ pixel or a ¼ pixel based on an interpolated pixel. The motion prediction module may predict a current prediction unit by changing the motion prediction method. As motion prediction methods, various methods, such as a skip method, a merge method, an AMVP (Advanced Motion Vector Prediction) method, an intra block copy method, etc., may be used.

The intra prediction unit 125 may generate a prediction block based on reference pixel information, which is pixel information in the current picture. Reference pixel information may be derived from a selected one of a plurality of reference pixel lines. The N-th reference pixel line among the plurality of reference pixel lines may include left pixels having an x-axis difference of N from a top-left pixel in the current block and top pixels having a y-axis difference of N from the top-left pixel of the current block. The number of reference pixel lines that the current block can select may be 1, 2, 3, or 4.

If the neighboring block of the current prediction unit is a block that has performed inter prediction and the reference pixel is a pixel resulting from performing inter prediction, the reference pixel included in the block that has performed inter prediction may be replaced with reference pixel information of the neighboring block that has performed intra prediction. That is, when the reference pixel is not available, the reference pixel information that is not available may be replaced with at least one information of the available reference pixels.

Prediction modes in intra prediction may include a directional prediction mode using reference pixel information depending on a prediction direction and a non-directional prediction mode not using directional information in performing prediction. A mode for predicting luma information may be different from a mode for predicting chroma information, and in order to predict the chroma information, intra prediction mode information used to predict luma information or predicted luma signal information may be utilized.

In performing intra prediction, when a size of the prediction unit is the same as a size of the transform unit, intra prediction may be performed on the prediction unit based on pixels positioned at the left, the top left, and the top of the prediction unit.

In the intra prediction method, a prediction block may be generated after applying a smoothing filter to a reference pixel according to a prediction mode. Whether to apply the smoothing filter may be determined according to the selected reference pixel line.

In order to perform the intra prediction method, an intra prediction mode of the current prediction unit may be predicted from the intra prediction mode of the prediction unit neighboring to the current prediction unit. In prediction of the prediction mode of the current prediction unit by using mode information predicted from the neighboring prediction unit, when the intra prediction mode of the current prediction unit is the same as the intra prediction mode of the neighboring prediction unit, information indicating that the prediction modes of the current prediction unit and the neighboring prediction unit are equal to each other may be transmitted using predetermined flag information. When the prediction mode of the current prediction unit is different from the prediction mode of the neighboring prediction unit, entropy encoding may be performed to encode prediction mode information of the current block.

Also, a residual block including information on a residual value which is a different between the prediction unit subjected to prediction and the original block of the prediction unit may be generated based on prediction units generated by the prediction modules 120 and 125. The generated residual block may be input to the transform module 130.

The transform module 130 may transform the residual block including the information on the residual value between the original block and the prediction unit generated by the prediction modules 120 and 125 by using a transform method, such as discrete cosine transform (DCT), discrete sine transform (DST), and KLT. Whether to apply DCT, DST, or KLT in order to transform the residual block may be determined based on intra prediction mode information of the prediction unit used to generate the residual block.

The quantization module 135 may quantize values transformed to a frequency domain by the transform module 130. Quantization coefficients may vary depending on the block or importance of a picture. The values calculated by the quantization module 135 may be provided to the inverse quantization module 140 and the rearrangement module 160.

The rearrangement module 160 may rearrange coefficients of quantized residual values.

The rearrangement module 160 may change a coefficient in the form of a two-dimensional block into a coefficient in the form of a one-dimensional vector through a coefficient scanning method. For example, the rearrangement module 160 may scan from a DC coefficient to a coefficient in a high frequency domain using a zigzag scanning method so as to change the coefficients to be in the form of one-dimensional vectors. Depending on a size of the transform unit and the intra prediction mode, vertical direction scanning where coefficients in the form of two-dimensional blocks are scanned in the column direction or horizontal direction scanning where coefficients in the form of two-dimensional blocks are scanned in the row direction may be used instead of zigzag scanning. That is, which scanning method among zigzag scanning, vertical direction scanning, and horizontal direction scanning is used may be determined depending on the size of the transform unit and the intra prediction mode.

The entropy encoding module 165 may perform entropy encoding based on the values calculated by the rearrangement module 160. Entropy encoding may use various encoding methods, for example, exponential Golomb coding, context-adaptive variable length coding (CAVLC), and context-adaptive binary arithmetic coding (CABAC).

The entropy encoding module 165 may encode a variety of information, such as residual value coefficient information and block type information of the coding unit, prediction mode information, partition unit information, prediction unit information, transform unit information, motion vector information, reference frame information, block interpolation information, filtering information, etc. from the rearrangement module 160 and the prediction modules 120 and 125.

The entropy encoding module 165 may entropy encode the coefficients of the coding unit input from the rearrangement module 160.

The inverse quantization module 140 may inversely quantize the values quantized by the quantization module 135 and the inverse transform module 145 may inversely transform the values transformed by the transform module 130.

The residual value generated by the inverse quantization module 140 and the inverse transform module 145 may be combined with the prediction unit predicted by a motion estimation module, a motion compensation module, and the intra prediction module of the prediction modules 120 and 125 such that a reconstructed block can be generated.

The filter module 150 may include at least one of a deblocking filter, an offset correction unit, or an adaptive loop filter (ALF).

The deblocking filter may remove block distortion that occurs due to boundaries between the blocks in the reconstructed picture. In order to determine whether to perform deblocking, the pixels included in several rows or columns in the block may be a basis of determining whether to apply the deblocking filter to the current block. When the deblocking filter is applied to the block, a strong filter or a weak filter may be applied depending on required deblocking filtering strength. Also, in applying the deblocking filter, horizontal direction filtering and vertical direction filtering may be processed in parallel.

The offset correction module may correct offset with the original picture on the basis of a pixel in the picture subjected to deblocking. In order to perform the offset correction on a particular picture, it is possible to use a method of applying offset in consideration of edge information of each pixel or a method of partitioning pixels of a picture into the predetermined number of regions, determining a region to be subjected to perform offset, and applying the offset to the determined region.

Adaptive loop filtering (ALF) may be performed based on the value obtained by comparing the filtered reconstructed picture and the original picture. The pixels included in the picture may be partitioned into predetermined groups, a filter to be applied to each of the groups may be determined, and filtering may be individually performed for each group. Information on whether to apply ALF and a luma signal may be transmitted by coding units (CU). The shape and filter coefficient of a filter for ALF may vary depending on each block. Also, the filter for ALF in the same shape (fixed shape) may be applied regardless of characteristics of the application target block.

The memory 155 may store the reconstructed block or picture calculated through the filter module 150. The stored reconstructed block or picture may be provided to the prediction modules 120 and 125 in performing inter prediction.

Figure 2:
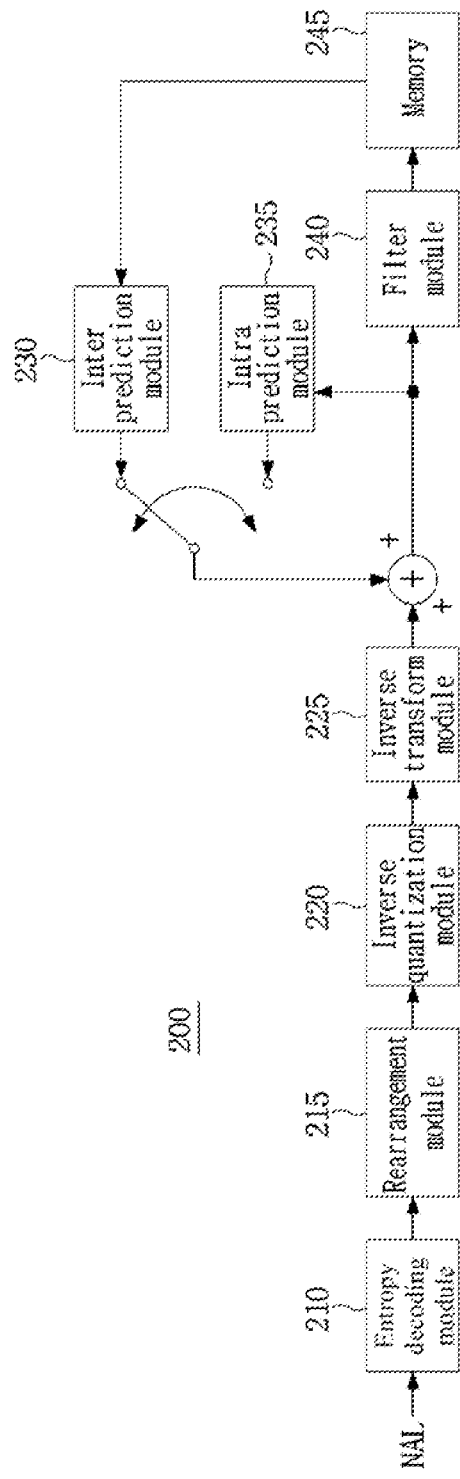
FIG. 2 is a block diagram illustrating a device for decoding a video according to an embodiment of the present disclosure.

FIG. 2 is a block diagram illustrating a device for decoding a video according to an embodiment of the present disclosure.

Referring to FIG. 2, the device 200 for decoding a video may include: an entropy decoding module 210, a rearrangement module 215, an inverse quantization module 220, an inverse transform module 225, prediction modules 230 and 235, a filter module 240, and a memory 245.

When a video bitstream is input from the device for encoding a video, the input bitstream may be decoded according to an inverse process of the device for encoding a video.

The entropy decoding module 210 may perform entropy decoding according to an inverse process of entropy encoding by the entropy encoding module of the device for encoding a video. For example, corresponding to the methods performed by the device for encoding a video, various methods, such as exponential Golomb coding, context-adaptive variable length coding (CAVLC), and context-adaptive binary arithmetic coding (CABAC) may be applied.

The entropy decoding module 210 may decode information on intra prediction and inter prediction performed by the device for encoding a video.

The rearrangement module 215 may perform rearrangement on the bitstream entropy decoded by the entropy decoding module 210 based on the rearrangement method used in the device for encoding a video. The rearrangement module may reconstruct and rearrange the coefficients in the form of one-dimensional vectors to the coefficient in the form of two-dimensional blocks. The rearrangement module 215 may receive information related to coefficient scanning performed in the device for encoding a video and may perform rearrangement via a method of inversely scanning the coefficients based on the scanning order performed in the device for encoding a video.

The inverse quantization module 220 may perform inverse quantization based on a quantization parameter received from the device for encoding a video and the rearranged coefficients of the block.

The inverse transform module 225 may perform the inverse transform, i.e., inverse DCT, inverse DST, and inverse KLT, which is the inverse process of transform, i.e., DCT, DST, and KLT, performed by the transform module on the quantization result by the device for encoding a video. Inverse transform may be performed based on a transfer unit determined by the device for encoding a video. The inverse transform module 225 of the device for decoding a video may selectively perform transform schemes (e.g., DCT, DST, and KLT) depending on a plurality of pieces of information, such as the prediction method, a size of the current block, the prediction direction, etc.

The prediction modules 230 and 235 may generate a prediction block based on information on prediction block generation received from the entropy decoding module 210 and previously decoded block or picture information received from the memory 245.

As described above, like the operation of the device for encoding a video, in performing intra prediction, when a size of the prediction unit is the same as a size of the transform unit, intra prediction may be performed on the prediction unit based on the pixels positioned at the left, the top left, and the top of the prediction unit. In performing intra prediction, when the size of the prediction unit is different from the size of the transform unit, intra prediction may be performed using a reference pixel based on the transform unit. Also, intra prediction using N×N partitioning may be used for only the smallest coding unit.

The prediction modules 230 and 235 may include a prediction unit determination module, an inter prediction module, and an intra prediction module. The prediction unit determination module may receive a variety of information, such as prediction unit information, prediction mode information of an intra prediction method, information on motion prediction of an inter prediction method, etc. from the entropy decoding module 210, may partition a current coding unit into prediction units, and may determine whether inter prediction or intra prediction is performed on the prediction unit. By using information required in inter prediction of the current prediction unit received from the device for encoding a video, the inter prediction module 230 may perform inter prediction on the current prediction unit based on information of at least one of a previous picture or a subsequent picture of the current picture including the current prediction unit. Alternatively, inter prediction may be performed based on information of some pre-reconstructed regions in the current picture including the current prediction unit.

In order to perform inter prediction, it may be determined for the coding unit which of a skip mode, a merge mode, an AMVP mode, and an inter block copy mode is used as the motion prediction method of the prediction unit included in the coding unit.

The intra prediction module 235 may generate a prediction block based on pixel information in the current picture. When the prediction unit is a prediction unit subjected to intra prediction, intra prediction may be performed based on intra prediction mode information of the prediction unit received from the device for encoding a video. The intra prediction module 235 may include an adaptive intra smoothing (AIS) filter, a reference pixel interpolation module, and a DC filter. The AIS filter performs filtering on the reference pixel of the current block, and whether to apply the filter may be determined depending on the prediction mode of the current prediction unit. AIS filtering may be performed on the reference pixel of the current block by using the prediction mode of the prediction unit and AIS filter information received from the device for encoding a video. When the prediction mode of the current block is a mode where AIS filtering is not performed, the AIS filter may not be applied.

When the prediction mode of the prediction unit is a prediction mode in which intra prediction is performed based on the pixel value obtained by interpolating the reference pixel, the reference pixel interpolation module may interpolate the reference pixel to generate the reference pixel of an integer pixel or less than an integer pixel. When the prediction mode of the current prediction unit is a prediction mode in which a prediction block is generated without interpolation the reference pixel, the reference pixel may not be interpolated. The DC filter may generate a prediction block through filtering when the prediction mode of the current block is a DC mode.

The reconstructed block or picture may be provided to the filter module 240. The filter module 240 may include the deblocking filter, the offset correction module, and the ALF.

Information on whether or not the deblocking filter is applied to the corresponding block or picture and information on which of a strong filter and a weak filter is applied when the deblocking filter is applied may be received from the device for encoding a video. The deblocking filter of the device for decoding a video may receive information on the deblocking filter from the device for encoding a video, and may perform deblocking filtering on the corresponding block.

The offset correction module may perform offset correction on the reconstructed picture based on a type of offset correction and offset value information applied to a picture in performing encoding.

The ALF may be applied to the coding unit based on information on whether to apply the ALF, ALF coefficient information, etc. received from the device for encoding a video. The ALF information may be provided as being included in a particular parameter set.

The memory 245 may store the reconstructed picture or block for use as a reference picture or block, and may provide the reconstructed picture to an output module.

As described above, in the embodiment of the present invention, for convenience of explanation, the coding unit is used as a term representing a unit for encoding, but the coding unit may serve as a unit performing decoding as well as encoding.

In addition, the current block represents a block to be encoded/decoded, and may represent a coding tree block (or coding tree unit), a coding block (or coding unit), a transform block (or transform unit), and a prediction block (or prediction unit) or a block to which the in-loop filter is applied, etc. according to an encoding/decoding step. In this specification, 'unit' denotes a basic unit for performing a specific encoding/decoding process, and 'block' may denote a pixel array having a predetermined size. Unless otherwise specified, 'block' and 'unit' may be used interchangeably. For example, in an embodiment to be described later, it may be understood that the coding block (coding block) and the coding unit (coding unit) have the same meaning as each other.

Figure 3:
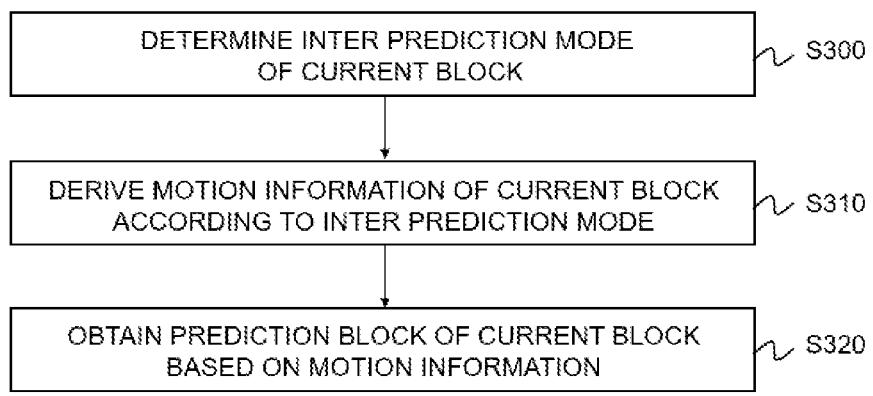
FIG. 3 illustrates an inter prediction method in an image decoding apparatus according to the present disclosure.

FIG. 3 illustrates an inter prediction method in an image decoding apparatus according to the present disclosure.

Referring to FIG. 3, an inter prediction mode of a current block may be determined (S300).

At least one of a plurality of inter prediction modes pre-defined in the image decoding apparatus may be determined as the inter prediction mode of the current block. Herein, the plurality of inter prediction modes may include a skip mode, a merge mode, an advanced motion vector prediction (AMVP) mode, and the like. In addition, a combined inter and intra prediction (CIIP) mode, a decoder side motion vector refinement (DMVR) mode, and the like may be used as additional modes.

Prediction mode information indicating the inter prediction mode of the current block may be signaled from the image encoding apparatus to the image decoding apparatus. The prediction mode information may be included in a bitstream and received by the image decoding apparatus. The prediction mode information may be expressed as a plurality of flag information, and the inter prediction mode of the current block may be determined through hierarchical signaling of a plurality of flag information. Alternatively, the prediction mode information may include index information indicating one of a plurality of candidate modes.

For example, the skip flag may be signaled to indicate whether to apply the skip mode, and when the skip mode is not applied, the merge flag may be signaled to indicate whether to apply the merge mode. When the merge mode is not applied, the AMVP mode may be applied.

On the other hand, when the merge mode is not applied to the current block, information (inter_pred_idc) indicating whether list0 (L0) prediction, list1 (L1) prediction, or bi-prediction is used for the current block is signaled to the current block. The information may be referred to as motion prediction direction information, inter prediction direction information, or inter prediction indication information. In this specification, for convenience of description, the inter prediction type (L0 prediction, L1 prediction, or BI prediction) indicated by inter_pred_idc of a syntax element may be indicated as a motion prediction direction. L0 prediction, L1 prediction, bi-prediction may be expressed as pred_L0, pred_L1, and pred_BI, respectively.

One picture may include one or more slices. The slice may have any one type of intra (I) slice, predictive (P) slice, or bi-predictive (B) slice. The slice type may be indicated based on slice type information. For a block in I slice, inter prediction is not used and only intra prediction may be used. Of course, even in this case, the original sample value may be coded and signaled without prediction. For a block in a P slice, intra prediction and/or inter prediction may be used, and when inter prediction is used, only uni-prediction may be used. Meanwhile, for a block in a B slice, intra prediction and/or inter prediction may be used, and when inter prediction is used, not only uni-prediction but also bi-prediction may be used.

L0 and L1 may include reference pictures encoded/decoded before the current picture. For example, L0 may include reference pictures before and/or after the current picture in POC order, and L1 may include reference pictures after and/or before the current picture in POC order. In this case, in L0, less reference picture indexes may be allocated to reference pictures before the current picture in POC order, and in L1, less reference picture indexes may be allocated to reference pictures after the current picture in POC order. In the case of B slice, bi-prediction may be applied, and even in this case, bi-prediction in one direction may be applied, or bi-prediction in both directions may be applied.

Information on the inter prediction mode of the current block may be signaled by being coded at a level such as CU (CU syntax), or may be implicitly determined according to a predetermined condition. Some modes are explicitly signaled, and other modes may be implicitly derived.

For example, the CU syntax may define information on the (inter) prediction mode as follows.

cu_skip_flag may indicate whether the skip mode is applied to the current block (CU).

pred_mode_ibc_flag may indicate whether the current block is a block coded in the IBC prediction mode. For example, when the value of pred_mode_ibc_flag is 1, it specifies that the current block is coded in the IBC prediction mode, and when the value of pred_mode_ibc_flag is 0, it may specify that the current block is not coded in the IBC prediction mode. Herein, the IBC prediction mode refers to a mode of predicting by referring to a region which belongs to the same picture as the current block and is pre-restored before the current block. The pre-restored region is specified based on a predetermined motion vector.

general_merge_flag may indicate availability of the general merge mode. When the value of general_merge_flag is 1, a regular merge mode, a mmvd mode, and a merge subblock mode (subblock merge mode) may be used. For example, when the value of general_merge_flag is 1, the merge data syntax may be parsed from the bitstream, and the merge data syntax may be configured/coded to include the following information.

merge_subblock_flag may indicate whether a subblock-based merge mode is applied to the current block. merge_subblock_idx may specify a merge candidate index of a subblock-based merge candidate list.

regular_merge_flag may indicate whether the merge mode (i.e., regular merge mode) is applied to the current block. For example, when the value of regular_merge_flag is 1, a regular merge mode or a merge mode with motion vector difference (MMVD) may be used to derive motion information of the current block.

mmvd_merge_flag may indicate whether MMVD is applied to the current block. Herein, MMVD may mean a mode in which a motion vector is modified by adding a predetermined MVD to a motion vector pre-derived according to the merge mode. For example, when the value of mmvd_merge_flag is 1, MMVD may be used to derive motion information of the current block. The mmvd_cand_flag may indicate whether the first candidate of the merge candidate list is used as a motion vector of the merge mode or the second candidate is used as a motion vector of the merge mode.

ciip_flag may indicate whether the CIIP mode is applied to the current block. The CIIP mode means a method in which an inter prediction block and an intra prediction block are generated through inter prediction and intra prediction for the current block, respectively, and a final prediction block of the current block is generated through a weighted sum of the inter prediction block and the intra prediction block. Herein, the inter prediction block may be performed based on any one of the aforementioned inter prediction modes. Alternatively, the inter prediction block may be generated using only a merge mode (in particular, a regular merge mode) of the aforementioned inter prediction modes. The intra prediction block may be generated using only a non-directional mode (e.g., planar mode) among pre-defined intra prediction modes.

Referring to FIG. 3, motion information of a current block according to the determined inter prediction mode may be derived (S310).

The motion information may include at least one of a motion vector (my), a reference picture index (refIdx), or a prediction direction flag (predFlagL0, predFlagL1). The motion vector specifies the position of the reference block, and the reference picture index may specify the reference picture of the current block from among one or more reference pictures included in the reference picture list. Also, predFlagL0 may indicate whether to perform L0 prediction, and predFlagL1 may indicate whether to perform L1 prediction.

When the merge mode is applied, motion information of the current block is not directly transmitted, and motion information of the current block may be derived using motion information of a neighboring block. Motion information of the current block may be indicated by transmitting a flag indicating that the merge mode has been used and a merge index specifying a merge candidate of the current block in the merge candidate list. The merge mode may be called a regular merge mode. For example, the merge mode may be applied when the value of regular_merge_flag is 1.

Hereinafter, a method of deriving motion information according to the merge mode will be described in detail.

The merge candidate list may be constructed using five merge candidate blocks. For example, four spatial merge candidates and one temporal merge candidate may be used.

The image decoding apparatus inserts spatial merge candidates derived by searching spatial neighboring blocks of the current block into the merge candidate list. For example, the spatial neighboring blocks may include at least one of a bottom-left neighboring block (A0), a left neighboring block (A1), a top-right neighboring block (B0), a top neighboring block (B1), or a top-left neighboring block (B2) of the current block. However, this is only an example, and in addition to the spatial neighboring blocks described above, a right neighboring block, a bottom neighboring block, a bottom-right neighboring block, etc. may be further used, or may be used instead of the spatial neighboring blocks described above.

The image decoding apparatus may detect available blocks by searching for the spatial neighboring blocks based on priority, and derive motion information of the detected blocks as spatial merge candidates. For example, the image decoding apparatus may construct a merge candidate list by searching for five blocks in the order of A1, B1, B0, A0, and B2 and sequentially indexing available candidates. However, the present disclosure is not limited thereto, and the five blocks may be searched in the order of B1, A1, B0, A0, and B2. The B2 block may be searched only when at least one of the remaining blocks A1, B1, B0, and A0 is unavailable. Herein, the "unavailable" may mean a case in which the block belongs to a slice or tile different from a current block, a case in which the block is coded in an intra mode, and the like.

In addition, in order to insert a spatial merge candidate, a redundancy check between spatial neighboring blocks may be performed. This is to exclude a spatial neighboring block having the same motion information as a spatial neighboring block already determined as a spatial merge candidate from the merge candidate list. However, the redundancy check may be performed only between pre-defined block pair in order to reduce computational complexity. Here, the block pair may be defined as (A1, B1), (B0, B1), (A0, A1), (B1, B2), (A1, B2). That is, if the spatial neighboring block at the A0 position is available, it may be checked whether the spatial neighboring blocks at the A1 and B0 positions have the same motion information as the spatial neighboring block at the location B1. If the spatial neighboring block at the A1 position is available, it may be checked whether the spatial neighboring block at the A0 position has the same motion information as the spatial neighboring block at the A1 position. As a result of the redundancy check, if it has the same motion information, the corresponding spatial neighboring block may not be inserted into the merge candidate list. However, the block pair is only an example, and may be defined as (A0, A1), (A0, B0), (B0, B1), (B0, B2), (A0, B2).

The image decoding apparatus may insert a temporal merge candidate derived by searching for a temporal neighboring block of the current block into the merge candidate list. The temporal neighboring block may belong to a reference picture which is a picture different from the current picture including the current block. The reference picture including the temporal neighboring block may be referred to as a collocated picture or a col picture. The temporal neighboring block may be a bottom-right neighboring block (C0) of a co-located block with respect to the current block in the col picture or a center block (C1) including a center position of the co-located block. The search for the temporal neighboring block may be performed in the order of C0 and C1.

The image decoding apparatus may check whether the number of current merge candidate(s) inserted into the merge candidate list through the above-described process is less than the number of maximum merge candidates. The number of the maximum merge candidates may be pre-defined or may be signaled from an image encoding apparatus to an image decoding apparatus. For example, the image encoding apparatus may generate information on the number of the maximum merge candidates, encode the information, and transmit it to the image decoding apparatus in the form of a bitstream. When the number of current merge candidates is the same as the number of maximum merge candidates, an additional merge candidate insertion process may not proceed.

As a result of the checking, when the number of the current merge candidates is less than the number of the maximum merge candidates, the video decoding apparatus inserts an additional merge candidate into the merge candidate list. The additional merge candidate may include at least one of a history-based merge candidate(s), a pair-wise average merge candidate(s), or a zero vector merge candidate to be described later.

History-based merge candidate may be added to the merge candidate list, and may be added after the spatial merge candidate and the temporal merge candidate. That is, motion information of a block coded before the current block may be stored in a buffer having a predetermined size and may be used as a merge candidate of the current block. Hereinafter, a pre-coded block or motion information of the pre-coded block stored in the buffer will be referred to as an HVMP candidate.

The buffer includes a plurality of HMVP candidates, but the number of HMVP candidates in units of CTU rows may be reset (initialized) to zero. When the pre-coded block is coded in the inter mode and is not a subblock-based merge mode, the pre-coded block may be added to the buffer as an HMVP candidate. In this case, the pre-coded block may be added to the last entry of the buffer or may be added to the first entry. The size of the buffer is 5, which may mean that up to 5 HMVP candidates can be added to the buffer. When a new HMVP candidate is added, the previously stored HMVP candidate may be removed from the buffer (i.e., first-in-first-out method). However, when an HMVP candidate having the same motion information as the newly added HMVP candidate exists in the buffer, the HVMP candidate having the same motion information may be removed from the buffer. After the removal, all or some of the remaining HMVP candidates are moved forward in the buffer. For example, when the i-th HMVP candidate is removed, the (i+1)-th HMVP candidate is moved to the position of the i-th HMVP candidate, and the (i+2)-th HMVP candidate is moved to the position of the (i+1)-th HMVP candidate. Then, the newly added HMVP candidate may be added to the last entry of the buffer.

A redundancy check may be performed between HMVP candidate(s) recently added among HMVP candidates belonging to the buffer and spatial/temporal merge candidates. However, in order to reduce the number of operations for the redundancy check, the number (H) of HMVP candidates used to generate the merge candidate list may be variably determined based on the number (N) of merge candidates present in the merge candidate list. For example, when the number (N) of merge candidates present in the merge candidate list is less than or equal to 4, H may be set as the number of available HMVP candidates in the buffer. On the other hand, when the number (N) of merge candidates present in the merge candidate list is greater than 4, H may be set to (8-N). However, the addition of the history-based merge candidate may be performed only until the number of current merge candidates in the merge candidate list reaches the value resulting from subtracting one from the number of the maximum merge candidates.

In addition, in this specification, Pair-wise average merge candidate may be referred to as an average merge candidate. The pair-wise average merge candidate may be generated through an average operation of a pre-defined merge candidate pair among merge candidates in the merge candidate list. The merge candidate pair may be defined as {(0, 1), (0, 2), (1, 2), (0, 3), (1, 3), (2, 3)}, where a number may mean a merge index of the merge candidate list. Even after the average merge candidate is added to the merge candidate list, if the number of current merge candidates in the merge candidate list does not reach the number of the maximum merge candidates, the zero vector merge candidate may be added as the last entry of the merge candidate list. The addition of the zero vector merge candidate may be performed until the number of current merge candidates in the merge candidate list reaches the number of the maximum merge candidates.

On the other hand, as a result of the checking, when the number of the current merge candidates is not less than the number of the maximum merge candidates, the image decoding apparatus may terminate the construction of the merge candidate list. In this case, the image encoding apparatus may select an optimal merge candidate among merge candidates constructing the merge candidate list based on a rate-distortion (RD) cost, and selection information (e.g. merge index) indicating the selected merge candidate may be signaled to the image decoding apparatus. The image decoding apparatus may select the optimal merge candidate based on the merge candidate list and the selection information.

Motion information of the selected merge candidate may be used as motion information of the current block.

Referring to FIG. 3, a prediction block of a current block may be obtained based on the derived motion information (S320).

The prediction block may include prediction samples of the current block. When the motion vector of the current block indicates a fractional sample unit, an interpolation procedure may be performed, and through this, a prediction sample of the current block may be derived based on the reference samples of the fractional sample unit in the reference picture.

The obtained prediction block may include at least one of a block obtained through L0 prediction (hereinafter, referred to as an L0 prediction block) or a block obtained through L1 prediction (hereinafter, referred to as an L1 prediction block). L0 prediction may refer to a prediction using a reference picture in reference picture list 0 (List0) and a motion vector in the L0 direction (mvL0), and L1 prediction may refer to a prediction using a reference picture in the reference picture list 1 (List1) and a motion vector in the L1 direction (mvL1).

For example, when the current block performs uni-prediction, only one of an L0 prediction block or an L1 prediction block may be obtained for the current block. In particular, when the current block performs only L0 prediction (i.e., predFlagL0=1 and predFlagL1=0), only the L0 prediction block may be obtained for the current block. On the other hand, when the current block performs L1 prediction (ie, predFlagL0=0 and predFlagL1=1), only the L1 prediction block may be obtained for the current block. The obtained L0 or L1 prediction block may be used as a prediction block of the current block, or a prediction block of the current block may be obtained by applying weighted prediction to the obtained L0 or L1 prediction block.

Meanwhile, when the current block performs bi-prediction, an L0 prediction block and an L1 prediction block are obtained for the current block, respectively, and a prediction block of the current block may be obtained through weighted prediction of the L0 prediction block and the L1 prediction block.

Weighted prediction according to the present disclosure may be largely divided into explicit weighted prediction and default weighted prediction. One of explicit weighted prediction or default weighted prediction may be selectively used based on at least one of a predetermined flag (weightedPredFlag) or a weight index (bcwIdx) to be described later. For example, when the value of weightedPredFlag is 0 or the value of the weight index is not 0, default weighted prediction may be applied. When the value of weightedPredFlag is 1 and the value of the weight index is 0, explicit weighted prediction may be applied.

When the slice type of the slice to which the current block belongs is a P slice, the value of weightedPredFlag may be set as a value of a flag (weighted_pred_flag) specifying whether explicit weighted prediction is applied for P slice.

When the slice type of the slice to which the current block belongs is a B slice, the value of weightedPredFlag is may be set based on at least one of a flag (weighted_bipred_flag) specifying whether explicit weighted prediction is applied for B slice or a flag specifying whether the DMVR mode is applied (dmvrFlag). For example, the value of weightedPredFlag may be set equal to a value resulting from an AND operation between weighted_bipred_flag and dmvrFlag (i.e., weighted_bipred_flag && dmvrFlag) or an AND operation between weighted_bipred_flag and the opposite value of dmvrFlag (i.e., weighted_bipred_flag && !dmvrFlag). The syntax weighted_pred_flag and/or weighted_bipred_flag may be transmitted to the image decoding apparatus through a higher header such as a sequence parameter set, a picture parameter set, and a slice header. Alternatively, it may be independently encoded and transmitted according to slices, tiles, sub-pictures, and the like.

The DMVR mode may mean a technique for improving (modifying) a pre-derived motion vector in a decoder. Specifically, in the DMVR mode, a motion vector may be improved by applying a bilateral matching method to two reference blocks for bi-prediction. Bi-directional motion vectors may be improved by adding/subtracting motion vector offsets to each of them. In this case, a sign of a motion vector offset added to each of the bi-directional motion vectors may be opposite to each other. The absolute value of the motion vector offset added to each of the bi-directional motion vectors may be the same. Alternatively, the absolute value of a motion vector offset added to each bi-directional motion vector may be determined based on the ratio of the POC difference between the current picture and the reference picture in the L0 direction and the POC difference between the current picture and the reference picture in the L1 direction.

When it is determined that the DMVR mode is applied to the current block, the value of dmvrFlag may be set to 1 (true), and otherwise, the value of dmvrFlag may be set to 0 (false). Whether the DMVR mode is applied to the current block may be determined by considering at least one of the inter prediction mode applied to the current block, whether bi-prediction is applied to the current block, whether the CIIP mode is applied to the current block, the position/type of a reference picture of the current block, a weight index, whether a reference picture of the current block has a weight for explicit weighted prediction, or a size of the current block.

For example, it may be determined that the DMVR mode is applied to the current block only when all or some of the predetermined conditions described below are satisfied. When a value of the above-described general_merge_flag is 1, it may be determined that the DMVR mode is applied. When bi-prediction is applied to the current block, it may be determined that the DMVR mode is applied. When the CIIP mode is not applied to the current block, it may be determined that the DMVR mode is applied. When the POC difference between the current picture to which the current block belongs and the reference picture in the L0 direction of the current block is the same as the POC difference between the current picture and the reference picture in the L1 direction of the current block, it may be determined that the DMVR mode is applied. When the reference pictures in the L0 and L1 directions correspond to the short-term reference pictures, it may be determined that the DMVR mode is applied. When a value of the weight index is 0, it may be determined that the DMVR mode is applied. When both the reference picture in the L0 direction and the reference picture in the L1 direction do not have weights for explicit weighted prediction, it may be determined that the DMVR mode is applied. When a size of the current block is greater than or equal to a predetermined threshold size, it may be determined that the DMVR mode is applied. Here, the size of the current block may be expressed as a width, a height, a maximum/minimum value of the width and the height, a sum of a width and a height, a product of a width and a height, and the like. The threshold size is a value pre-promised in the image encoding/decoding apparatus, and may be an integer of 8, 16, 32, 64, 128, or more.

Hereinafter, the default/explicit weighted prediction will be described in detail.

1. Default Weighted Prediction

The default weighted prediction may mean weighted prediction of an L0/L1 prediction block based on a weight candidate pre-defined in an image encoding/decoding apparatus. The default weighted prediction may be performed as shown in Equations 1 to 4 below based on predFlagL0 and predFlagL1 of the current block.

(CASE 1) In case of predFlagL0=1 and predFlagL1=0

This is a case where the current block performs only L0 prediction, and only the L0 prediction block may be obtained for the current block. In this case, the prediction block of the current block may be obtained by applying a predetermined offset (offset1) to the pre-obtained L0 prediction block. Here, the offset may be variably determined based on the bitdepth of the encoded image. For example, the prediction block of the current block may be obtained through weighted prediction as shown in Equation 1 below.

$$pbSamples[x][y]=Clip3(0,(1<<bitDepth)-1,(predSamplesL0[x][y]+offset1)>>shift1) \quad \text{[Equation 1]}$$

In Equation 1, pbSamples[x][y] may mean a prediction block of a current block, and predSamplesL0[x][y] may mean an L0 prediction block obtained through L0 prediction. Offset1 may be set to (1<<(shift1−1)), and shift1 may be set to Max(2, 14−bitDepth). The variable bitDepth refers to the bitdepth of the encoded image, which may be determined based on information encoded to specify the bitdepth of the luma/chroma sample. The information may be signaled at a higher level, that is, at least one of a video parameter set, a sequence parameter set, a picture parameter set, a picture header, or a slice header.

$$pbSamples[x][y]=Clip3(0,(1<<bitDepth)-1,(predSamplesL1[x][y]+offset1)>>shift1)$$

(CASE 2) In case of predFlagL0=0 and predFlagL1=1

This is a case where the current block performs only L1 prediction, and only the L1 prediction block may be obtained for the current block. In this case, the prediction block of the current block may be obtained by applying a predetermined offset (offset1) to the pre-obtained L1 prediction block. For example, the prediction block of the current block may be obtained through weighted prediction as shown in Equation 2 below.

[Equation 2]

In Equation 2, pbSamples[x][y] may mean a prediction block of the current block, and predSamplesL1[x][y] may mean an L1 prediction block obtained through L1 prediction. Offset1 and shift1 are the same as those described in CASE 1, and detailed descriptions will be omitted.

(CASE 3) In case of predFlagL0=1 and predFlagL1=1

This is a case where the current block performs both L0 prediction and L1 prediction, and L0 and L1 prediction blocks may be obtained for the current block. In this case, the prediction block of the current block may be obtained by applying at least one of a predetermined weight or an offset to the pre-obtained L0 and L1 prediction blocks. The weight and offset may be determined based on at least one of a weight candidate, a weight index (bcwIdx), or whether the current block is a block coded in the CIIP mode.

For example, when the value of the weight index is 0, the prediction block of the current block may be obtained through weighted prediction as shown in Equation 3 below.

$$pbSamples[x][y]=Clip3(0,(1<<bitDepth)-1,(predSamplesL0[x][y]+predSamplesL1[x][y]+offset2)>>shift2) \quad \text{[Equation 3]}$$

In Equation 3, pbSamples[x][y] means a prediction block of the current block, and predSamplesL0[x][y] and predSamplesL1[x][y] are L0 prediction block and L1 prediction block obtained through L0 and L1 prediction, respectively. The same weight is applied to the L0 and L1 prediction blocks, respectively, which means that the prediction block of the current block is obtained through the average of the L0 and L1 prediction blocks. The offset (offset2) for weighted prediction is set to (1<<(shift2−1)), where the variable shift2 may be set to Max(3, 15−bitDepth). Meanwhile, even when the current block is a block coded in the CIIP mode, the weighted prediction as shown in Equation 3 may be equally applied.

On the other hand, when the value of the weight index is not 0, the prediction block of the current block may be obtained through weighted prediction as shown in Equation 4 below.

$$pbSamples[x][y]=Clip3(0,(1<<bitDepth)-1,(w0*predSamplesL0[x][y]+w1*predSamplesL1[x][y]+offset3)>>(shift1+3)) \quad \text{[Equation 4]}$$

In Equation 4, pbSamples[x][y], predSamplesL0[x][y] and predSamplesL1[x][y] are as described above, and w0 and w1 are weights to be applied to the L0 prediction block and the L1 prediction block, respectively. The offset (offset3) for weighted prediction is set to (1<<(shift1+2)), where the variable shift1 may be set to Max(2, 14−bitDepth).

The weights {w0, w1} of Equation 4 may be determined based on weight candidates pre-defined in the image encoding/decoding apparatus and a weight index (bcwIdx). The weight candidates may include at least one of {4, 4}, {3, 5}, {5, 3}, {−2, 10}, or {10, −2}. Each weight candidate has a unique index, and a weight candidate having the same index as the weight index (bcwIdx) may be set as weights for default weighted prediction.

The weight index (bcwIdx) may be information for specifying any one of a plurality of weight candidates. In the case of the merge mode, the weight index may be derived from the merge candidate specified by the merge index. In the case of the AMVP mode, the weight index may be encoded and signaled by an image encoding apparatus. However, the weight index may be limitedly signaled based on at least one of an inter prediction indicator (inter_pred_idc), a flag indicating whether a reference picture in the L0/L1 direction has a weight in the L0/L1 direction (luma_weight_1X_flag, chroma_weight_1X_flag, X=0, 1) or a size of the current block. luma_weight_1X_flag and chroma_weight_1X_flag may be also defined as flags indicating whether a weight in the L0/L1 direction exists, and will be described in detail later in FIG. 4.

For example, the weight index may be signaled only when the current block uses bi-prediction according to the inter prediction indicator (inter_pred_idc). The weight index may be signaled only when a weight corresponding to a reference picture does not exist according to a flag indicating whether a weight in the L0/L1 direction exists. The weight index may be signaled only when the size of the current block is greater than or equal to a predetermined threshold. Here, the size of the current block may be expressed as a width, a height, a product of the width and the height, or the minimum (or maximum) value of the width and the height of the current block, and the threshold may be 16, 32, 64, 128 or 256.

2. Explicit Weighted Prediction

Explicit weighted prediction may mean weighted prediction of L0 and L1 prediction blocks of the current block based on weighted prediction information that is explicitly signaled. An explicit weighted prediction method using weighted prediction information will be described in detail with reference to FIG. 4.

Figure 4:
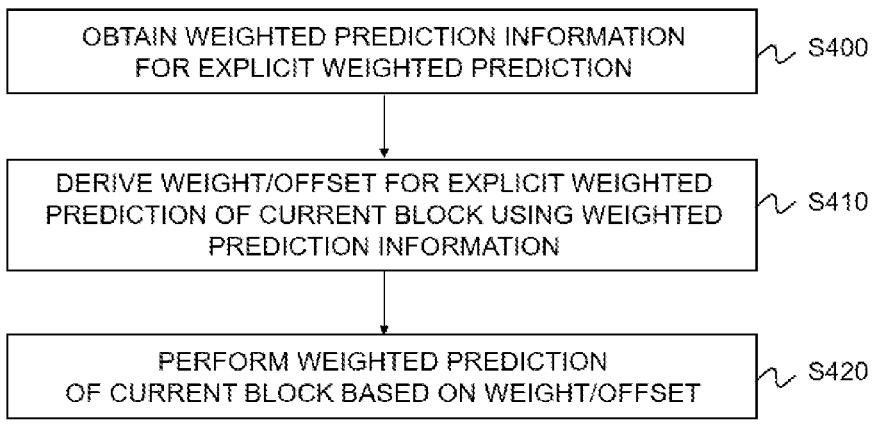
FIG. 4 illustrates an explicit weighted prediction method in an image decoding apparatus according to the present disclosure.

FIG. 4 illustrates an explicit weighted prediction method in an image decoding apparatus according to the present disclosure.

Referring to FIG. 4, weighted prediction information for explicit weighted prediction may be obtained (S400).

The weighted prediction information may include at least one of common weight information, weight number information, a flag indicating whether a weight exists, weight delta information, or offset information.

TABLE 1

| | Descriptor |
|---|---|
| pred_weight_table( ) { | |
|   luma_log2_weight_denom | ue(v) |
|   if( sps_chroma_format_idc != 0 ) | |
|     delta_chroma_log2_weight_denom | se(v) |
|   if( pps_wp_info_in_ph_flag ) | |
|     num_l0_weights | ue(v) |
|   for( i = 0; i < NumWeightsL0; i++ ) | |
|     luma_weight_l0_flag[ i ] | u(1) |
|   if( sps_chroma_format_idc != 0 ) | |
|     for( i = 0; i < NumWeightsL0; i++ ) | |
|       chroma_weight_l0_flag[ i ] | u(1) |
|   for( i = 0; i < NumWeightsL0; i++ ) { | |
|     if( luma_weight_l0_flag[ i ] ) { | |
|       delta_luma_weight_l0[ i ] | se(v) |
|       luma_offset_l0[ i ] | se(v) |
|     } | |
|     if( chroma_weight_l0_flag[ i ] ) | |
|       for( j = 0; j < 2; j++ ) { | |
|         delta_chroma_weight_l0[ i ][ j ] | se(v) |
|         delta_chroma_offset_l0[ i ][ j ] | se(v) |
|       } | |
|   } | |
|   if( pps_weighted_bipred_flag && | |
|   pps_wp_info_in_ph_flag && | |
|     num_ref_entries[ 1 ][ RplsIdx[ 1 ] ] > 0 ) | |
|     num_l1_weights | ue(v) |
|   for( i = 0; i < NumWeightsL1; i++ ) | |
|     luma_weight_l1_flag[ i ] | u(1) |
|   if( sps_chroma_format_idc != 0 ) | |
|     for( i = 0; i < NumWeightsL1; i++ ) | |
|       chroma_weight_l1_flag[ i ] | u(1) |
|   for( i = 0; i < NumWeightsL1; i++ ) { | |
|     if( luma_weight_l1_flag[ i ] ) { | |
|       delta_luma_weight_l1[ i ] | se(v) |
|       luma_offset_l1[ i ] | se(v) |
|     } | |
|     if( chroma_weight_l1_flag[ i ] ) | |
|       for( j = 0; j < 2; j++ ) { | |
|         delta_chroma_weight_l1[ i ][ j ] | se(v) |
|         delta_chroma_offset_l1[ i ][ j ] | se(v) |
|       } | |
|   } | |
| } | |

Referring to Table 1, first, common weight information may be signaled by an image encoding apparatus. The common weight information may specify a weight reference value commonly used when deriving a weight for explicit weight prediction. The common weight information may be commonly used to derive the weight w0 in the L0 direction and the weight w1 in the L1 direction. The common weight information may be signaled for the luma component and the chroma component, respectively (luma_log 2_weight_denom, delta_chroma_log 2_weight_denom). Here, the common weight information of the chroma component may be encoded as a difference between the weight reference value of the luma component and the weight reference value of the chroma component.

Weighted prediction information excluding the common weight information may be signaled for the L0 direction and the L1 direction, respectively. Here, the weighted prediction information in the L0 direction may be for reference pictures of the reference picture list for the P slice (or L0 reference picture list), and the weighted prediction information in the L1 direction may be for reference pictures of a reference picture list for the B slice (or L1 reference picture list).

First, regarding the weighted prediction information in the L0 direction, weight number information (num_l0_weights) specifying the number of weights signaled for the L0 direction may be signaled. However, the weight number information may be adaptively signaled based on a flag (wp_info_in_ph_flag, hereinafter referred to as a first flag) that specifies a location where the weighted prediction information is signaled. Here, the first flag may specify whether the weighted prediction information is present in the picture header or the slice header. For example, when the value of the first flag is 1, weighted prediction information may be present in the picture header, but may indicate that it may not be present in the slice header. On the other hand, when the value of the first flag is 0, it may indicate that the weighted prediction information may not be present in the picture header, but may be present in the slice header.

A flag indicating whether there is a weight in the L0 direction as much as the number according to the weight number information is signaled, which may be signaled for each of a luma component and a chroma component (luma_weight_l0_flag, chroma_weight_l0_flag, hereinafter referred to as a second flag).

Based on the second flag, weight delta information and offset information in the L0 direction may be adaptively signaled. Here, the weight delta information may specify a difference between the weight for explicit weight prediction and the aforementioned weight reference value. When the value of the second flag is 1, weight delta information and offset information in the L0 direction are signaled, and when the value of the second flag is 0, weight delta information and offset information in the L0 direction are not signaled, Each can be derived to zero. When the second flag is 1, the value of the weight delta information in the L0 direction should be in the range of −128 to 127. The above-described weight delta information and offset information may be signaled for each of a luma component and a chroma component.

Next, regarding the weighted prediction information in the L1 direction, weight number information (num_l1_weights) specifying the number of weights signaled for the L1 direction may be signaled. However, the weighted number information is adaptively signaled based on at least one of a flag (wp_info_in_ph_flag) specifying a location where the weighted prediction information is signaled or a flag (pps_weighted_bipred_flag) indicating whether explicit weighted prediction is applied for B slice. Here, when the value of pps_weighted_bipred_flag is 1, it may indicate that explicit weighted prediction is applied. When the value of pps_weighted_bipred_flag is 0, it may indicate that explicit weighted prediction is not applied, and default weighted prediction may be applied instead.

For example, when weight prediction information is signaled in the picture header (i.e., wp_info_in_ph_flag=1) and explicit weighted prediction is applied for B slice (i.e., pps_weighted_bipred_flag=1), the weighted number information may be signaled. On the other hand, when the weight prediction information is signaled in the picture header, but the explicit weighted prediction is not applied for B slice (i.e., pps_weighted_bipred_flag=0), the weighted number information is not signaled, and instead it may be derived as 0.

In addition, the weight number information (num_l1_weights) may be signaled by further considering the number of reference pictures included in the L1 reference picture list. For example, only when the number of reference pictures included in the L1 reference picture list is greater than a predetermined threshold number, the weight number information may be signaled. Here, the threshold number may be a value pre-defined in the image decoding apparatus and may be 0, 1, or 2. However, the present disclosure is not limited thereto, and the threshold number may be an integer greater than 2.

A flag indicating whether there is a weight in the L1 direction as much as the number according to the weight number information may be signaled, which may be signaled for each of a luma component and a chroma component (luma_weight_l1_flag, chroma_weight_l1_flag, hereinafter referred to as a third flag).

Based on the third flag, weight delta information and offset information in the L1 direction may be adaptively signaled. Here, the weight delta information may specify a difference between the weight for explicit weight prediction and the aforementioned weight reference value. When the value of the third flag is 1, weight delta information and offset information in the L1 direction are signaled, and when the value of the third flag is 0, weight delta information and offset information in the L1 direction are not signaled, each of them can be derived to zero. When the third flag is 1, the value of the weight delta information in the L1 direction should be in the range of −128 to 127. The above-described weight delta information and offset information may be signaled for each of a luma component and a chroma component.

All or some of the above-described weighted prediction information may be encoded in units of pictures and signaled to an image decoding apparatus, or may be encoded and signaled at a lower level such as a sub-picture, a slice, or a tile. Some of the weighted prediction information (e.g., luma_log 2_weight_denom) may not be encoded by the image encoding apparatus and may be set to a fixed value pre-committed by the image encoding/decoding apparatus.

Referring to FIG. 4, at least one of a weight or an offset for explicit weighted prediction of a current block may be derived using the above-described weighted prediction information (S410). The weight and offset for the explicit weighted prediction may be derived for each of the luma component and the chroma component.

First, the weight of the luma component may be derived using common weight information and weight delta information. For example, it may be derived as Equation 5 below.

$$w0 = \text{LumaWeight}L0[\text{refIdx}L0]$$

$$w1 = \text{LumaWeight}L1[\text{refIdx}L1] \quad \text{[Equation 5]}$$

In Equation 5, w0 may denote a weight in the L0 direction, and w1 may denote a weight in the L1 direction. LumaWeightL0[i] may be derived as ((1<<luma_log 2_weight_denom)+delta_luma_weight_l0[i]), and LumaWeightL1[i] may be derived as ((1<<luma_log 2_weight_denom)+delta_luma_weight_l1[i]). refIdxL0 and refIdxL1 may mean a reference picture index in the L0 direction and a reference picture index in the L1 direction of the current block, respectively. That is, the weight in the L0 direction may be derived using common weight information and weight delta information corresponding to the reference picture index (refIdxL0) in the L0 direction of the current block. Likewise, the weight in the L1 direction may be derived using common weight information and weight delta information corresponding to the reference picture index (refIdxL1) in the L1 direction of the current block.

However, when the value of the flag indicating whether the weight in the L0 direction is present is 0, the weight in the L0 direction may be derived using only the common weight information, and the weight in the L0 direction may be derived as 2luma_log 2_weight_denom. Likewise, when the value of the flag indicating whether the weight in the L1 direction is present is 0, the weight in the L1 direction may be derived using only the common weight information, and the weight in the L1 direction may be derived as 2luma_log 2_weight_denom.

The offset of the luma component may be derived using offset information. For example, it may be derived as Equation 6 below.

$$o0 = \text{luma\_offset\_l0}[\text{refIdx}L0] << (\text{bitDepth}-8)$$

$$o1 = \text{luma\_offset\_l1}[\text{refIdx}L1] << (\text{bitDepth}-8) \quad \text{[Equation 6]}$$

In Equation 6, o0 may denote an offset in the L0 direction, and o1 may denote an offset in the L1 direction. luma_offset_l0 and luma_offset_l1 correspond to offset information, and may mean offset information corresponding to the reference picture indexes (refIdxL0, refIdxL1) of the current block among offset information signaled by the number according to the weight number information.

The weight of the chroma component may be derived using common weight information and weight delta information. For example, it may be derived as Equation 7 below.

$$w0 = \text{ChromaWeight}L0[\text{refIdx}L0]$$

$$w1 = \text{ChromaWeight}L1[\text{refIdx}L1] \quad \text{[Equation 7]}$$

In Equation 7, w0 may denote a weight in the L0 direction, and w1 may denote a weight in the L1 direction. ChromaWeightL0[i] may be derived as ((1<<ChromaLog2WeightDenom)+delta_chroma_weight_l0[i]), and ChromaWeightL1[i] may be derived as ((1<<ChromaLog2WeightDenom)+delta_chroma_weight_l1[i]). Here, the variable ChromaLog2WeightDenom may be derived as the sum of the common weight information signaled for each of the luma component and the chroma component described above (i.e., luma_log 2_weight_denom+delta_chroma_log 2_weight_denom). refIdxL0 and refIdxL1 may mean a reference picture index in the L0 direction and a reference picture index in the L1 direction of the current block, respectively. That is, the weight in the L0 direction may be derived using common weight information signaled for the luma/chroma component and weight delta information corresponding to the reference picture index (refIdxL0) in the L0 direction of the current block. Likewise, the weight in the L1 direction may be derived using common weight information signaled for the luma/chroma component and weight delta information corresponding to the reference picture index (refIdxL1) in the L1 direction of the current block.

However, when the value of the flag indicating whether the weight in the L0 direction is present is 0, the weight in the L0 direction may be derived using only the common weight information, and the weight in the L0 direction may be derived as 2ChromaLog2WeightDenom. Likewise, when the value of the flag indicating whether the weight in the L1 direction is present is 0, the weight in the L1 direction may be derived using only the common weight information, and the weight in the L1 direction may be derived as 2ChromaLog2WeightDenom.

The offset of the chroma component may be derived using offset information. For example, it may be derived as Equation 8 below.

$o0 = \text{ChromaOffset}L0[\text{refIdxL0}] << (\text{bitDepth}-8)$ $o1 = \text{ChromaOffset}L1[\text{refIdxL1}] << (\text{bitDepth}-8)$ [Equation 8]

In Equation 8, o0 may denote an offset in the L0 direction, o1 may denote an offset in the L1 direction, and refIdxL0 and refIdxL1 may denote a reference picture index in the L0 direction and a reference picture index in the L1 direction of the current block, respectively. Here, the variables ChromaOffsetL0 and ChromaOffsetL1 may be derived based on at least one of offset information of a chroma component, a pre-derived weight, or a variable ChromaLog2WeightDenom. For example, they may be derived as shown in Equation 9 below.

$\text{ChromaOffset}L0[i] = \text{Clip3}(-128,127,(128+\text{delta\_chroma\_offset\_l0}[i]-((128*\text{ChromaWeight}L0[i])>>\text{ChromaLog2WeightDenom})))$ $\text{ChromaOffset}L1[i] = \text{Clip3}(-128,127,(128+\text{delta\_chroma\_offset\_l1}[i]-((128*\text{ChromaWeight}L1[i])>>\text{ChromaLog2WeightDenom})))$ [Equation 9]

Referring to FIG. 4, weighted prediction of a current block may be performed based on the derived weight and offset (S420).

Specifically, explicit weighted prediction may be performed in consideration of whether the current block performs L0 prediction (predFlagL0) and whether the current block performs L1 prediction (predFlagL1).

(CASE 1) When only one of predFlagL0 or predFlagL1 is 1

When the current block performs only one of L0 prediction or L1 prediction, only one of the L0 prediction block or the L1 prediction block may be obtained for the current block. In this case, the prediction block of the current block may be obtained by applying predetermined weight and offset to the pre-obtained L0 or L1 prediction block.

However, the prediction block of the current block may be obtained by further considering whether the variable log 2Wd is less than a predetermined threshold. Here, here, the variable log 2Wd may be derived as (luma_log 2_weight_denom+shift1). When a predetermined constant value is greater than or equal to a threshold value pre-committed to the image decoding apparatus, the variable shift1 may be set to a predetermined constant value. Otherwise, the variable shift1 may be set to the threshold value. The predetermined constant value may be defined as (14−bitDepth), and the threshold value may be an integer of 0, 1, 2 or more.

For example, when the variable log 2Wd is greater than or equal to a predetermined threshold, the prediction block of the current block may be obtained as shown in Equation 10 below.

$pb\text{Samples}[x][y]=\text{Clip3}(0,(1<<\text{bitDepth})-1,((\text{predSamples}LX[x][y]*w+2 \log 2Wd-1)>>\log 2Wd)+o)$ [Equation 10]

In Equation 10, pbSamples may mean a prediction block of the current block, that is, a weighted prediction block, and predSamplesLX may mean an L0 prediction block or an L1 prediction block of the current block. w and o may mean a weight and an offset, respectively. When predFlagL0 is 1, w and o are the weight in the L0 direction (w0) and the offset in the L0 direction (o0), respectively, and when predFlagL1 is 1, w and o are the weight in the L1 direction (w1) and the offset in the L1 direction (o1), respectively.

Meanwhile, when the variable log 2Wd is less than a predetermined threshold, the prediction block of the current block may be obtained as shown in Equation 11 below.

$pb\text{Samples}[x][y]=\text{Clip3}(0,(1<<\text{bitDepth})-1,((\text{predSamples}LX[x][y]*w+o)$ [Equation 11]

In Equation 11, pbSamples, predSamplesLX, w and o are as described in Equation 10, and redundant descriptions will be omitted.

Alternatively, the prediction block of the current block may be obtained as shown in Equation 12 below without considering whether the variable log 2Wd is less than the predetermined threshold.

$pb\text{Samples}[x][y]=\text{Clip3}(0,(1<<\text{bitDepth})-1,((\text{predSamples}LX[x][y]*w+2 \log 2Wd-1)>>\log 2Wd)+o)$ [Equation 12]

In Equation 12, pbSamples, predSamplesLX, w and o are as described in Equation 10, and redundant descriptions will be omitted.

(CASE 2) When Both predFlagL0 and predFlagL1 are 1

This is a case where the current block performs L0 prediction and L1 prediction, and an L0 prediction block and an L1 prediction block may be obtained for the current block. In this case, the prediction block of the current block may be obtained as shown in Equation 13 below by applying predetermined weights and offsets to the pre-obtained L0 and L1 prediction blocks.

$pb\text{Samples}[x][y]=\text{Clip3}(0,(1<<\text{bitDepth})-1,(\text{predSamples}L0[x][y]*w0+\text{predSamples}L1[x][y]*w1+((o0+o1+1)<<\log 2Wd))>>(\log 2Wd+1))$ [Equation 13]

Figure 5:
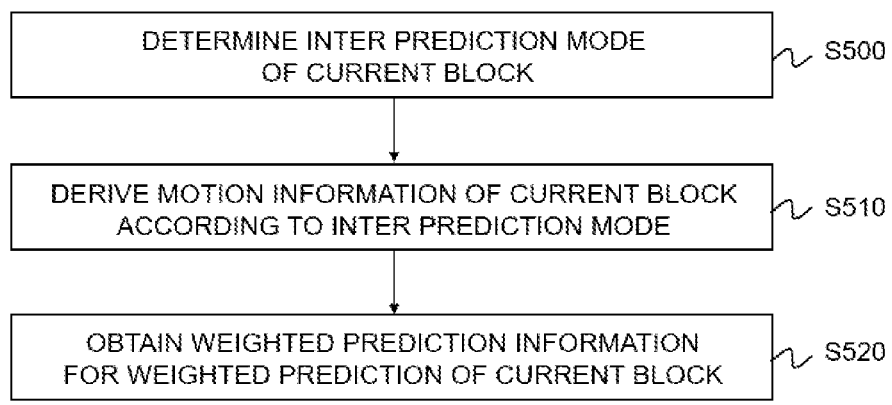
FIG. 5 illustrates an inter prediction method in an image encoding apparatus according to the present disclosure.

FIG. 5 illustrates an inter prediction method in an image encoding apparatus according to the present disclosure.

Referring to FIG. 5, an inter prediction mode of a current block may be determined (S500).

At least one of a plurality of inter prediction modes pre-defined in the image encoding apparatus may be determined as the inter prediction mode of the current block. Here, the plurality of inter prediction modes may include a skip mode, a merge mode, an advanced motion vector prediction (AMVP) mode, and the like. In addition, a combined inter and intra prediction (CIIP) mode, a decoder side motion vector refinement (DMVR) mode, and the like may be used as additional modes.

The image encoding apparatus may encode prediction mode information indicating an inter prediction mode of the current block and signal this to the image decoding apparatus. The prediction mode information may include index information indicating one of a plurality of candidate modes. Alternatively, the inter prediction mode may be indicated by hierarchically encoding flag information. In this case, the prediction mode information may include one or more flags. The prediction mode information related to the inter prediction mode has been described in detail with reference to FIG. 3, and a detailed description thereof will be omitted.

Referring to FIG. 5, motion information of a current block according to the determined inter prediction mode may be derived (S510).

The image encoding apparatus may derive optimal motion information for the current block through motion estimation. The motion information includes at least one of a motion vector (mv), a reference picture index (refIdx), or a prediction direction flag (predFlagL0, predFlagL1), as described with reference to FIG. 3.

For example, the image encoding apparatus may search for a similar reference block with high correlation in units of fractional pixels within a predetermined search range within the reference picture by using the original block in the original picture for the current block. Through this, motion information of the current block may be derived.

The similarity of the blocks may be derived based on the difference between the phase-based sample values. For example, the similarity of the blocks may be calculated based on the SAD between the current block (or the template of the current block) and the reference block (or the template of the reference block). In this case, motion information may be derived based on the reference block having the smallest SAD in the search area. The derived motion information may be signaled to the image decoding apparatus in various ways according to a pre-defined inter prediction mode.

In order to perform a merge mode, the video encoding apparatus may search for a merge candidate block used to derive motion information of a current block. For example, up to five merge candidate blocks may be used, but the embodiment(s) of the present specification are not limited thereto. In addition, the maximum number of merge candidate blocks may be transmitted in at least one of a video parameter set, a sequence parameter set, a picture parameter set, a picture header, a slice header, or a tile group header, but the embodiment(s) of the present specification is not limited to this.

After finding the merge candidate blocks, the image encoding apparatus may generate a merge candidate list composed of a plurality of merge candidates based on this, and the merge candidate having the smallest cost among them may be selected as a final merge candidate for deriving motion information of the current block. A merge index specifying the selected final merge candidate may be encoded and it may be signaled to an image decoding apparatus.

The merge candidate list includes at least one of a spatial merge candidate, a temporal merge candidate, a history-based merge candidate, an average merge candidate, or a zero vector merge candidate. Here, detailed description will be omitted. A method of generating a merge candidate list is as described in FIG. 3, and a detailed description thereof will be omitted.

Referring to FIG. 5, weighted prediction information for weighted prediction of a current block may be obtained (S520).

The weighted prediction may be one of the above-described explicit weighted prediction or default weighted prediction. The weighted prediction information may be obtained for at least one of an L0 prediction block or an L1 prediction block of a current block. Here, the L0/L1 prediction block may be obtained based on the motion information derived in S510.

The weighted prediction information may be obtained based on a predetermined weighted prediction coefficient (i.e., at least one of a predetermined weight or offset). A method of deriving a weight and an offset based on weighted prediction information has been described with reference to FIG. 4, and weighted prediction information may be obtained/coded based on the weighted prediction coefficient through the reverse process of the method. Here, the weighted prediction coefficient may be determined based on the L0/L1 prediction block of the current block, or may be determined based on the L0/L1 reference picture of the current block.

The weighted prediction information may include at least one of common weight information, weight number information, a flag indicating whether a weight exists, weight delta information, or offset information. The weighted prediction information may be encoded by an image encoding apparatus and signaled to an image decoding apparatus, and weighted prediction information excluding the common weight information may be encoded for each of the L0 direction and the L1 direction.

Specifically, in the case of weighted prediction information in the L0 direction, the weight number information may be encoded when a value of a flag (wp_info_in_ph_flag) specifying a position where the weighted prediction information is encoded is 1. The flag indicating whether a weight is present may be encoded as many as the number according to the weight number information. The weight delta information and the offset information are also encoded as many as the number according to the weight number information, and may be encoded only when the value of the flag indicating whether the weight is present is 1.

In the case of weighted prediction information in the L1 direction, the weight number information may be encoded when a value of a flag (wp_info_inph_flag) specifying a position where the weighted prediction information is encoded is 1. In addition, the weight number information may be encoded when the value of the flag (pps_weighted_bipred_flag) indicating whether explicit weighted prediction is applied for B slice is 1. However, the weight number information may be limited to be encoded only when the number of reference pictures included in the L1 reference picture list is greater than a threshold number pre-defined in the video encoding apparatus. Here, the threshold number may be 0, 1 or 2. The flag indicating whether a weight is present may be encoded as many as the number according to the weight number information. The weight delta information and the offset information are also encoded as many as the number according to the weight number information, and may be encoded only when the value of the flag indicating whether the weight is present is 1.

Meanwhile, the image encoding apparatus may derive residual samples of the current block based on prediction samples of the prediction block obtained based on the weighted prediction coefficient, and the residual information about the residual samples may be signaled to the image decoding apparatus.

The names of the syntaxes used in the above-described embodiments are only named for convenience of description.

It is included in the scope of the present disclosure to apply the embodiments described centering on the decoding process or the encoding process to the encoding process or the decoding process. It is also included in the scope of the present disclosure to change the embodiments described in a predetermined order in an order different from that described.

Although the above-described embodiments are described based on a series of steps or flowcharts, this does not limit the time-series order of the invention and may be performed simultaneously or in a different order as necessary. In addition, in the above-described embodiment, each component (e.g., a unit, a module, or the like.) constituting the block diagram may be implemented as a hardware device or software, and a plurality of components may be combined to be implemented as one hardware device or software. The above-described embodiments may be implemented in the form of program instructions that may be executed by various computer components, and may be recorded in a computer-readable recording medium. The computer-readable recording medium may include a program instruction, a data file, a data structure, etc. alone or in combination. Examples of computer-readable recording media include magnetic media such as a hard disk, a floppy disk and a magnetic tape, an optical recording media such as a CD-ROM, a DVD, and a magneto-optical media such as a floptical disk, and hardware devices specifically configured to store and execute a program instruction, such as a ROM, a RAM, a flash memory, and the like. The hardware device may be configured to operate as one or more software modules to perform the process according to the invention, and vice versa.

The invention claimed is:

1. A method of decoding an image, comprising:
    determining an inter prediction mode of a current block;
    deriving motion information of the current block according to the determined inter prediction mode;
    obtaining a first prediction block of the current block based on the derived motion information; and
    obtaining a second prediction block of the current block by applying an explicit weighted prediction to the first prediction block,
    wherein weighted prediction information for the explicit weighted prediction is explicitly signaled via a bitstream,
    wherein the weighted prediction information includes at least one of common weight information, weight number information, a first flag, weight delta information, or offset information,
    wherein, based on the common weight information, a reference weight value is obtained, wherein, based on the first flag, it is determined whether a weight for the explicit weighted prediction is equal to the reference weight value or not,
    wherein, in response to the first flag indicating that the weight is not equal to the reference weight value, the weight is derived by adding a difference, indicated by the weight delta information, to the reference weight value,
    wherein obtaining the second prediction block comprises:
        multiplying the weight to the first prediction block;
        adding a rounding offset to a result of the multiplication operation;
        shifting a result of the addition operation as much as a first variable derived based on the common weight information; and
        adding an additive offset to a result of the shifting operation, the additive offset being derived by the offset information, and
    wherein the second prediction block is obtained without comparing the first variable with a threshold value.

2. The method of claim 1, wherein the current block performs only one of L0 prediction or L1 prediction.

3. The method of claim 1, wherein whether the explicit weighted prediction is applied or not is determined based on at least one of a predetermined second flag or a weight index for default weighted prediction, and
    wherein the second flag is set based on a slice type of a slice to which the current block belongs.

4. The method of claim 3, wherein when the slice to which the current block belongs is a P slice, the second flag is set as a value of a third flag explicitly signaled via the bitstream, the third flag specifying whether the explicit weighted prediction is applied to the P slice, and
    wherein when the slice to which the current block belongs is a B slice, the second flag is set based on at least one of a fourth flag explicitly signaled via the bitstream or a fifth flag specifying whether a mode for modifying a pre-derived motion vector at a decoder is applied, the fourth flag specifying whether the explicit weighted prediction is applied to the B slice.

5. The method of claim 4, wherein a value of the fifth flag is determined by considering at least one of the inter prediction mode of the current block, whether bi-prediction is applied to the current block, a location or a type of a reference picture of the current block, the weight index for the default weighted prediction, whether the reference picture of the current block has a weight for the explicit weighted prediction or a size of the current block.

6. The method of claim 4, wherein the weight index for the default weighted prediction is information specifying any one of a plurality of weight candidates pre-defined in the decoder, and
    wherein the plurality of weight candidates includes at least one of {4, 4}, {3, 5}, {5, 3}, {−2, 10}, or {10, −2}.

7. A method of encoding an image, comprising:
    determining an inter prediction mode of a current block; and
    encoding the current block according to the inter prediction mode,
    wherein a first prediction block of the current block is obtained based on motion information according to the inter prediction mode,
    wherein a second prediction block of the current block is obtained by applying an explicit weighted prediction to the first prediction block,
    wherein weighted prediction information for the explicit weighted prediction is explicitly encoded into a bitstream,
    wherein the weighted prediction information includes at least one of common weight information, weight number information, a first flag, weight delta information, or offset information,
    wherein the common weight information is encoded based on a reference weight value,
    wherein the first flag indicates whether a weight for the explicit weighted prediction is equal to the reference weight value or not,
    wherein, in response to the first flag indicating that the weight is not equal to the reference weight value, the weight delta information indicating a difference between the reference weight value and the weight is further encoded,
    wherein encoding the second prediction block comprises:
        multiplying the weight to the first prediction block;
        adding a rounding offset to a result of the multiplication operation;
        shifting a result of the addition operation as much as a first variable derived based on the common weight information; and
        adding an additive offset to a result of the shifting operation, the additive offset being derived by the offset information, and
    wherein the second prediction block is obtained without comparing the first variable with a threshold value.

8. The method of claim 7, wherein the current block performs only one of L0 prediction or L1 prediction.

9. The method of claim 7, wherein whether the explicit weighted prediction is applied or not is determined based on at least one of a predetermined second flag or a weight index for default weighted prediction, and
    wherein the second flag is set based on a slice type of a slice to which the current block belongs.

10. The method of claim 9, wherein when the slice to which the current block belongs is a P slice, the second flag is set as a value of a third flag explicitly encoded into the bitstream, the third flag specifying whether the explicit weighted prediction is applied to the P slice, and wherein when the slice to which the current block belongs is a B slice, the second flag is set based on at least one of a fourth flag explicitly encoded into the bitstream or a fifth flag specifying whether a mode for modifying a pre-derived motion vector at a decoder is applied, the fourth flag specifying whether the explicit weighted prediction is applied to the B slice.

11. The method of claim 10, wherein a value of the fifth flag is determined by considering at least one of the inter prediction mode of the current block, whether bi-prediction is applied to the current block, a location or a type of a reference picture of the current block, the weight index for the default weighted prediction, whether the reference picture of the current block has a weight for the explicit weighted prediction or a size of the current block.

12. The method of claim 10, wherein the weight index for the default weighted prediction is information specifying any one of a plurality of weight candidates pre-defined in an encoder, and wherein the plurality of weight candidates includes at least one of $\{4, 4\}$, $\{3, 5\}$, $\{5, 3\}$, $\{-2, 10\}$, or $\{10, -2\}$.

13. A non-transitory computer-readable medium for storing data associated with an image signal, comprising:
a data stream encoded by an encoding method,
wherein the encoding method comprises:
determining an inter prediction mode of a current block; and
encoding the current block according to the inter prediction mode,
wherein a first prediction block of the current block is obtained based on motion information according to the inter prediction mode,
wherein a second prediction block of the current block is obtained by applying an explicit weighted prediction to the first prediction block,
wherein weighted prediction information for the explicit weighted prediction is explicitly encoded into a bitstream,
wherein the weighted prediction information includes at least one of common weight information, weight number information, a first flag, weight delta information, or offset information,
wherein the common weight information is encoded based on a reference weight value,
wherein the first flag indicates whether a weight for the explicit weighted prediction is equal to the reference weight value or not,
wherein, in response to the first flag indicating that the weight is not equal to the reference weight value, the weight delta information indicating a difference between the reference weight value and the weight is further encoded,
wherein encoding the second prediction block comprises:
multiplying the weight to the first prediction block;
adding a rounding offset to a result of the multiplication operation;
shifting a result of the addition operation as much as a first variable derived based on the common weight information; and
adding an additive offset to a result of the shifting operation, the additive offset being derived by the offset information, and
wherein the second prediction block is obtained without comparing the first variable with a threshold value.

* * * * *